US008698432B2

(12) United States Patent
Kern

(10) Patent No.: US 8,698,432 B2
(45) Date of Patent: Apr. 15, 2014

(54) DRIVING LOW VOLTAGE BRUSHLESS DIRECT CURRENT (BLDC) THREE PHASE MOTORS FROM HIGHER VOLTAGE SOURCES

(75) Inventor: Lynn R. Kern, Tucson, AZ (US)

(73) Assignee: Standard Microsystems Corporation, Hauppauge, NY (US)

( * ) Notice: Subject to any disclaimer, the term of this patent is extended or adjusted under 35 U.S.C. 154(b) by 615 days.

(21) Appl. No.: 12/872,834

(22) Filed: Aug. 31, 2010

(65) Prior Publication Data

US 2012/0049776 A1    Mar. 1, 2012

(51) Int. Cl.
*H02P 6/00*    (2006.01)

(52) U.S. Cl.
USPC ....... 318/400.01; 318/721; 318/599; 318/432

(58) Field of Classification Search
USPC ............. 318/400.01, 400.06, 400.14, 400.29, 318/400.32, 400.34, 599, 799, 432, 721, 318/400.02, 400.07, 400.09, 400.04, 318/400.13, 400.38; 388/811, 823
See application file for complete search history.

(56) References Cited

U.S. PATENT DOCUMENTS

| | | | |
|---|---|---|---|
| 4,259,630 A | 3/1981 | Killian | |
| 4,417,234 A | 11/1983 | McKenna | |
| 4,509,004 A | 4/1985 | Shepard, Jr. | |
| 4,510,422 A | 4/1985 | Ogura | |
| 4,573,037 A | 2/1986 | Robinton et al. | |
| 4,678,973 A | 7/1987 | Elliott et al. | |
| 4,779,034 A | 10/1988 | Shepard, Jr. | |
| 5,017,845 A | 5/1991 | Carobolante et al. | |
| 5,198,733 A | 3/1993 | Wright | |
| 5,315,225 A | 5/1994 | Heinrich et al. | |
| 5,343,127 A | 8/1994 | Maiocchi | |
| 5,350,984 A | 9/1994 | Carobolante et al. | |
| 5,397,972 A | 3/1995 | Maiocchi | |
| 5,455,885 A | 10/1995 | Cameron | |
| 5,572,097 A | 11/1996 | Cameron | |
| 5,614,797 A | 3/1997 | Carobolante | |
| 5,668,449 A | 9/1997 | Carobolante | |
| 5,731,670 A | 3/1998 | Galbiati et al. | |

(Continued)

OTHER PUBLICATIONS

"8904. 3-Phase Brushless DC Motor Controller/Driver With Back-EMF Sensing"; Allegro Microsystems, Inc.; Oct. 31, 2006; 18 pages.

(Continued)

*Primary Examiner* — Eduardo Colon Santana
*Assistant Examiner* — Thai Dinh
(74) *Attorney, Agent, or Firm* — King & Spalding, L.L.P.

(57) ABSTRACT

A control method for a sensor-less, brushless, three-phase DC motor. The stator coil in the electromagnets inside the motor may be used as the inductive element through which a voltage regulator can regulate the current as a means of regulating the output voltage. The value of the control signal provided to the drivers controlling power to the coils may be calculated based on at least the rail voltage, as measured in real time. This allows for a wide variation of input voltages, while maintaining a relatively constant output power to the motor. In general, by taking into account the value of the rail voltage when determining the final value of the control signal that is applied to the stator coils, the maximum current through the stator coils may be scaled to the same magnitude current that would be expected to flow through the coils if the rail voltage were the rated (nominal) fan/motor voltage, even when the actual rail voltage is different, e.g. higher than the rated fan/motor voltage.

18 Claims, 5 Drawing Sheets

(56) References Cited

U.S. PATENT DOCUMENTS

| | | | |
|---|---|---|---|
| 5,818,192 | A | 10/1998 | Nozari |
| 5,907,299 | A | 5/1999 | Green et al. |
| 5,929,577 | A | 7/1999 | Neidorff et al. |
| 6,051,942 | A * | 4/2000 | French .................. 318/254.1 |
| 6,100,656 | A | 8/2000 | El-Sadi et al. |
| 6,153,989 | A * | 11/2000 | Kardash et al. .......... 318/400.09 |
| 6,218,795 | B1 * | 4/2001 | Syukuri .................. 318/400.17 |
| 6,441,572 | B2 | 8/2002 | Batzel |
| 6,473,562 | B1 | 10/2002 | Stephan |
| 6,512,342 | B2 | 1/2003 | Kawagoshi |
| 6,586,898 | B2 | 7/2003 | King et al. |
| 6,639,371 | B2 | 10/2003 | Walters et al. |
| 6,642,681 | B2 | 11/2003 | Kawabata et al. |
| 6,650,082 | B1 | 11/2003 | Du |
| 6,826,499 | B2 | 11/2004 | Colosky et al. |
| 6,940,235 | B2 | 9/2005 | Getz et al. |
| 6,995,530 | B2 | 2/2006 | Biamonte et al. |
| 7,054,980 | B2 | 5/2006 | Wurzburg |
| 7,071,651 | B2 | 7/2006 | Toyozawa et al. |
| 7,096,134 | B2 | 8/2006 | Miller, Jr. |
| 7,158,067 | B2 | 1/2007 | Lauritzen et al. |
| 7,183,734 | B2 | 2/2007 | Lassen |
| 7,184,927 | B2 | 2/2007 | Anghel et al. |
| 7,202,623 | B2 | 4/2007 | Zhou et al. |
| 7,352,311 | B2 | 4/2008 | Miller et al. |
| 7,400,103 | B2 * | 7/2008 | Hofer ........................ 318/276 |
| 7,432,677 | B2 | 10/2008 | Heydt et al. |
| 7,592,761 | B2 | 9/2009 | MacKay |
| 7,612,702 | B2 | 11/2009 | Danesh |
| 8,067,910 | B2 * | 11/2011 | Sejimo .................. 318/400.01 |
| 8,072,167 | B2 * | 12/2011 | Jeung ..................... 318/400.17 |
| 2001/0048278 | A1 | 12/2001 | Young et al. |
| 2007/0216244 | A1 | 9/2007 | Edelson |
| 2008/0297081 | A1 | 12/2008 | Morita et al. |
| 2009/0049463 | A1 | 2/2009 | Ueda |
| 2009/0049464 | A1 | 2/2009 | Kang |
| 2009/0096397 | A1 | 4/2009 | Paintz et al. |

OTHER PUBLICATIONS

Ken Berringer, Bill Lucas, Leos Chalupa, and Libor Prokop; "Sensorless Brushless dc Motor Using the MC68HC908MR32 Embedded Motion Control Development System—AN 1858"; Freescale Semiconductor; 2004; 36 pages.

"XC164CM—Driving of a Brushless DC Motor without Sensors—AP 16090"; Infineon Technologies; 2006; 75 pages.

"IRMCF371—Sensorless Motor Control IC for Appliances"; International Rectifier; Dec. 5, 2006. 30 pages.

Jorge Zambada; "AN1078—Sensorless Field Oriented Control of PMSM Motors"; Microchip Technology Inc.; 2007; 30 pages.

"Sensorless Spindle Motor Controller—ML4411/ML4411A"; Micro Linear; May 1997; 15 pages.

"TDA5140A—Brushless DC Motor Drive Circuit"; Philips Semiconductors; Apr. 1994; 24 pages.

"Brushless Motor Driver with Speed Control for Portable Cassette Recorders—LB1877V"; SANYO Electric Co., Ltd.; Aug. 1999; 7 pages.

"Fan Motor Driver—LV8800V"; SANYO Semiconductor Co., Ltd; Aug. 2007; 8 pages.

"Sensorless Brushless DC Motor Reference Design—AN208"; Silicon Laboratories; 2006; 40 pages.

"Autonomous Three Phase Fan Controller—EMC3000"; Standard Microsystems Corporation; 2006; 8 pages.

"An Introduction to Sensorless Brushless DC Motor Drive Applications with the ST72141—AN1130"; ST Microelectronics; 2000; 29 pages.

"3-Phase Full-Wave Sensorless Controller for Brushless DC Motors—TB6537P/PG, TB6537F/FG"; Toshiba; Aug. 4, 2003; 17 pages.

"Sensorless Brushless DC Motor Control with Z8 Encore! MC Microcontrollers—AN022601-0905"; ZiLOG; 2005; 64 pages.

* cited by examiner

DRIVING LOW VOLTAGE BRUSHLESS DIRECT CURRENT (BLDC) THREE PHASE MOTORS FROM HIGHER VOLTAGE SOURCES

INCORPORATION BY REFERENCE

U.S. patent application Ser. No. 12/393,996, titled "Brushless, Three Phase Motor Drive", filed Feb. 26, 2009 and whose inventors are Lynn R. Kern and James P. McFarland; U.S. provisional application Ser. No. 61/108,320 titled "Sensor-less, Brushless, Three Phase Motor Drive", filed on Oct. 24, 2008 and whose inventor is Lynn R. Kern; U.S. patent application Ser. No. 12/620,726, titled "Brushless, Three Phase Motor Drive", filed Nov. 18, 2009 and whose inventors are Lynn R. Kern, Scott C. McLeod, and Kenneth W. Gay; and U.S. patent application Ser. No. 12/632,495, titled "Drive Method to Minimize Vibration and Acoustics In Three Phase Brushless DC (TPDC) Motors", filed Dec. 7, 2009 and whose inventors are Lynn R. Kern and James P. McFarland are all hereby incorporated by reference in their entirety as though fully and completely set forth herein.

BACKGROUND OF THE INVENTION

1. Field of the Invention

The invention generally relates to DC (Direct Current) motors used in various applications, such as hard disk drive motors, cooling fans, drive motors for appliances, etc.

2. Description of the Related Art

Electric motors are used to produce mechanical energy from electrical energy, used in a number of applications, including different household appliances, pumps, cooling fans, etc. Electric motors are generally classified as either alternating current (AC) motors or direct current (DC) motors.

Motors generally include a rotor, which is the non-stationary (moving) part of the motor, and a stator, which is the stationary part of the motor. The stator generally operates as a field magnet (e.g., electromagnet), interacting with an armature to induce motion in the rotor. The wires and magnetic field of the motor (typically in the stator) are arranged so that a torque is developed about the rotor's axis, causing rotation of the rotor. A motor typically also includes a commutator, which is an electrical switch that periodically reverses the current direction in the electric motor, helping to induce motion in the rotor. The armature carries current in the motor and is generally oriented normal to the magnetic field and the torque being generated. The purpose of the armature is to carry current crossing the magnetic field, thus creating shaft torque in the motor and to generate an electromotive force (EMF).

In a typical brushed DC motor, the rotor comprises one or more coils of wire wound around a shaft. Brushes are used to make mechanical contact with a set of electrical contacts (called the commutator) on the rotor, forming an electrical circuit between the DC electrical source and the armature coil-windings. As the armature rotates on an axis, the stationary brushes come into contact with different sections of the rotating commutator. The commutator and brush system form a set of electrical switches, each firing in sequence, such that electrical-power always flows through the armature coil closest to the stationary stator (permanent magnet). Thus an electrical power source is connected to the rotor coil, causing current to flow and producing electromagnetism. Brushes are used to press against the commutator on the rotor and provide current to the rotating shaft. The commutator causes the current in the coils to be switched as the rotor turns, keeping the magnetic poles of the rotor from ever fully aligning with the magnetic poles of the stator field, hence maintaining the rotation of the rotor. The use of brushes creates friction in the motor and leads to maintenance issues and reduced efficiency.

In a brushless DC motor, the commutator/brush-gear-assembly (which is effectively a mechanical "rotating switch") is replaced by an external electronic switch that's synchronized to the rotor's position. Brushless DC motors thus have an electronically controlled commutation system, instead of a mechanical commutation system based on brushes. In a brushless DC motor, the electromagnets do not move, but rather the permanent magnets rotate and the armature remains static. This avoids the problem of having to transfer current to the moving armature. Brushless DC motors offer a number of advantages over DC motors featuring brushes, including higher efficiency and reliability, reduced noise, longer lifetime (no brush erosion), the elimination of ionizing sparks from the commutator, and overall reduction of electromagnetic interference (EMI).

One issue oftentimes taken into consideration when designing motors, more specifically brushless motors, is the power required to operate the motor. One technique to reduce power in some applications has been the introduction of Three Phase Brushless DC (TPDC) Motors. Such motors are used in a variety of applications, for example in driving cooling fans. However, in certain cooling applications the desired power is not always available, oftentimes requiring the use of a non-ideal regulator to reduce the available voltage level to a level useable by the fan being driven by the motor. For example, a regulated voltage in the 5V DC to 12 V DC range may need to be derived from a 9V DC to 21V DC voltage provided by a battery in portable applications, or from a 20V DC to 48V DC voltage available in industrial applications. Because regulators are typically not 100% efficient, the efficiencies of all regulators between the source and point of use have to be multiplied to obtain an overall efficiency. Efficient switching step-down regulators, commonly known as "buck" regulators are widely used, and typically operate at 95% efficiency. If two regulators of this type are used in series, overall efficiency decreases to 90%.

Most current solutions are limited to developing very efficient buck regulators capable of high input voltages at relatively low current, and producing low voltage, high current outputs. Buck regulators can regulate current through an inductive element as a means of regulating output voltage. One method of implementing this control method is to use a fixed frequency PWM signal, and vary duty cycle based on load to maintain constant current. While such a control method can result in a very efficient voltage regulator, the efficiency of the regulator will have to be multiplied with the efficiency of the motor driver driving the fan to determine the overall electrical efficiency of the entire cooling subsystem. Anything less than 100% efficiency results in energy being lost in the conversion from one rail voltage to another. Further losses are encountered during the commutation process, as there are finite losses in the switching transistors that may be used in commutation. For example, a very efficient buck regulator—running at 95% efficiency—driving a motor driver that is 90% efficient would yield an overall electrical efficiency of 85.5%. In many cases this would represent less than the desired efficiency.

Other corresponding issues related to the prior art will become apparent to one skilled in the art after comparing such prior art with the present invention as described herein.

SUMMARY OF THE INVENTION

Various embodiments are presented of a system and method for controlling a brushless three-phase DC motor.

The motor may be an electronic motor, and may include a rotor having one or more permanent magnets. The one or more permanent magnets may be physically positioned in-board or out-board of the stationary section of the motor, referred to as the stator, which may include a plurality of electromagnets. The motor may include a voltage sensor configured to measure a voltage induced across one or more of the electromagnets. The voltage sensor may be part of the electromagnet. Each electromagnet may include such a voltage sensor, or alternatively, a voltage sensor may be used to measure voltage for some or all of the electromagnets. Alternatively, the motor may comprise one or more Hall sensors or other equivalent sensors for measuring voltage.

The system may include logic for controlling the operation of the motor. The logic may be analog or digital, e.g., the logic may include one or more state machine based controllers or one or more application specific integrated circuits. The motor may instead (or in addition) include a processor, such as a microcontroller, and a computer accessible memory medium storing program instructions executable to control the motor. The processor may be configured to execute program instructions from the memory medium to control the motor.

The logic may be configured to iteratively perform certain steps. A pulse-width modulation (PWM) duty cycle may be calculated based on a minimum duty cycle and an input command. The input command may be scalable from the minimum duty cycle to a maximum duty cycle. The input command may be updatable at an adjustable interval, such as a number of iterations of the method, or an amount of time. The adjustable interval may be adjusted based on either 1) a number of intervals that have occurred since initiation (e.g. an initial iteration) of the method, or; 2) an amount of time that has occurred since initiation of the method; or 3) an estimated or calculated speed of the motor.

A voltage may be measured at a first expected zero crossing value. In one embodiment, the voltage induced by rotation of the rotor may be sampled at a first expected zero crossing value. The voltage may be induced across an undriven electromagnet of the plurality of electromagnets. Sampling this induced voltage may produce a first sampled voltage value. An average of a plurality of sampled voltage values may then be calculated. The plurality of sampled voltage values may include voltage values sampled at a plurality of prior expected zero crossing values and the first sampled voltage. The first sampled voltage value may then be subtracted from the calculated average to produce a delta zero crossing error.

The delta zero crossing error may be multiplied by a first constant to produce a representation of an angular velocity, where the first constant may represent electromechanical properties of the motor. The representation of the angular velocity may be divided by second constant, then be truncated, e.g. to an integer value. One or more time values may then be generated based on the representation of the angular velocity. The one or more time values may include a period, e.g., an amount of time until a next commutation of the plurality of electromagnets. The one or more time values may indicate a next expected zero crossing value. The next expected zero crossing value may be the same time value as the next commutation time of the plurality of electromagnets, or they may be different time values.

Operation of the motor may then be controlled based on the one or more time values and the PWM duty cycle. More specifically, the plurality of electromagnets on the stator may be driven by periodic bursts of current whose frequency and power may be specified by the PWM duty cycle in such a way as to drive the rotor at a particular rotational speed, while the one or more time values may determine the commutation timing of the electromagnets on the stator, such that the electromagnetic field of the stator may remain substantially in optimal alignment with the rotor, effecting an efficient transfer of power to the rotor at that particular rotational speed.

The above operations may repeat over a plurality of iterations. In one embodiment, the next zero crossing value from the previous iteration is used as the first expected zero crossing value in the next iteration. In one set of embodiments, the stator coil in the respective electromagnets on the stator is used as the inductive element that a regulator, such as a buck regulator can use to regulate the current. While a regulator may typically regulate the current in the inductive element as a means of regulating the output voltage, in various embodiments disclosed herein, such regulators may be used specifically with the intent of regulating the current in the stator coils, without any intent of regulating the output voltage. The duty cycle to the coils may then be calculated based on both the input command, and the rail voltage used for powering the drivers that drive the plurality of electromagnets, as measured in real time. This allows for wide variation of input voltage, while maintaining a relatively constant output power to the motor drive. Thus, in addition to basing the final PWM duty cycle on the input command, another variable, the rail voltage may also be used to scale the final PWM duty cycle that is applied to the stator coils, to effectively scale the maximum current through the stator coils to the same magnitude current that would be expected to flow through the coils if the rail voltage were the rated (nominal) fan voltage, and not the actual rail voltage.

Thus, in one set of embodiments, a rotating motor—which includes a set of electromagnets, with each electromagnet having a respective coil—may be controlled by first inducing a respective current in one or more of the respective coils, using a regulated output voltage derived from a supply voltage, and issuing an input command to adjust a speed of rotation of the rotating motor to a desired base value. In addition, the value of a control signal may be determined based on the input command and the value of the supply voltage, and the induced respective current in one or more of the respective coils may be adjusted to a desired respective value using the control signal.

Figure 1A:
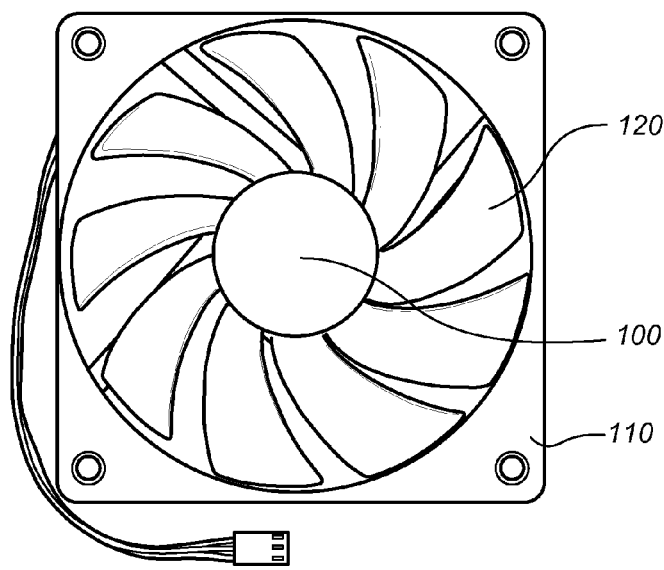
FIGS. 1A and 1B illustrate different views of an exemplary fan and fan motor.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE INVENTION

Figure 1B:
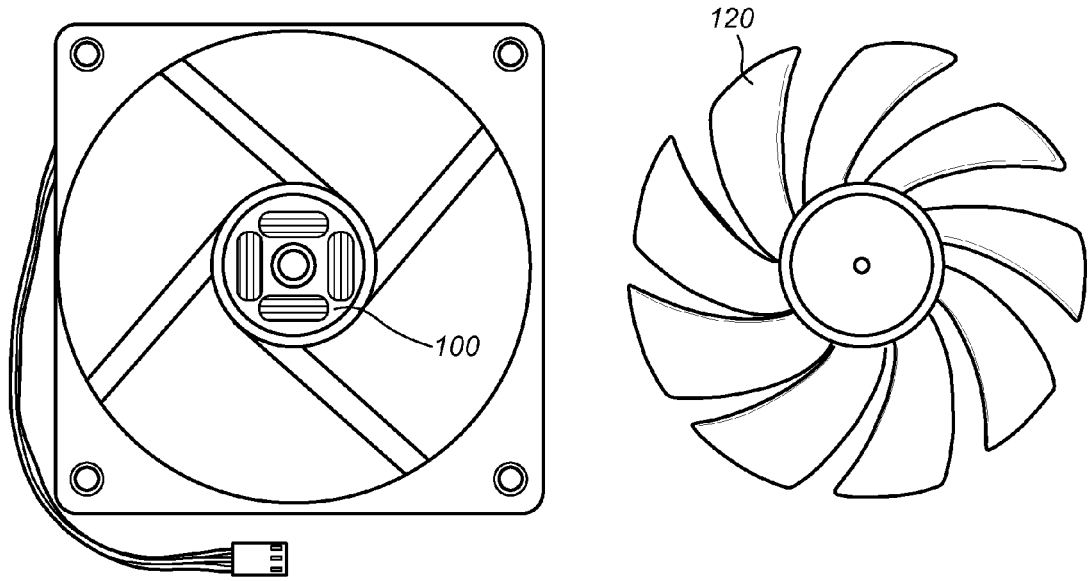

FIGS. 1A and 1B—Exemplary Fan and Fan Motor

FIGS. 1A and 1B illustrate an exemplary fan assembly 110 according to one embodiment. Fan 110 may be a cooling fan, for example a fan for use in a laptop or a desktop computer. Fan 110 may alternatively be a commercial or industrial fan, or in general any type of fan driven by a motor. Fan assembly 110 may include a motor assembly 100 as well as fan blades 120. Motor assembly 100 may comprise a motor (e.g. motor 102 shown in FIG. 5) as well as drive circuitry (for example, drive control logic 502 shown in FIG. 5) for controlling motor 102.

Although FIGS. 1A and 1B illustrate a fan as the load being driven by the motor, it should be noted that the system and method for controlling a motor as described herein may be suited for driving any of various types of loads, including without limitation hard disk drives, drive motors for appliances, propellers, wheels, pumps, or other loads.

Figure 2:
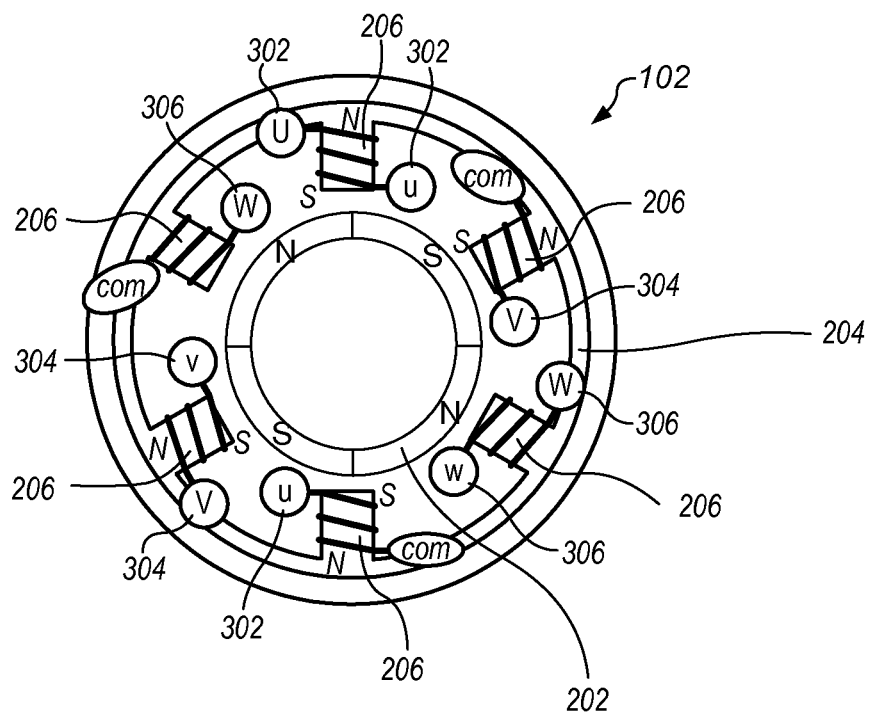
FIG. 2 illustrates a simplified diagram of one embodiment of a brushless four-pole three-phase electric motor.

FIG. 2—Brushless Four-Pole Three-Phase Motor

FIG. 2 illustrates a simplified diagram of an exemplary brushless four-pole three-phase motor 102. Motor 102 may be electrically powered, e.g., by direct current (DC) electricity. Motor 102 may also be electronically controlled, and may include a rotor 202, which may include one or more permanent magnets Rotor 202 may have four poles as shown, with alternating North "N" and South "S" poles. Alternatively, rotor 202 may include two, six or any other number of poles as desired. Motor 102 may include a stator 204 including a plurality of electromagnets 206, positioned around rotor 202. There may be six electromagnets 206, which may be arranged such that they are equally spaced with respect to each other around stator 204. Electromagnets 206 may be arranged as three pairs of electromagnets 206, such that each pair of electromagnets may be powered in a different phase than the other (remaining) pairs of electromagnets. The three pairs of electromagnets 206 may be connected in a "Y" configuration, making motor 102 a three-phase motor. Motor 102 may be brushless, e.g., it may not include any brushes relaying current to rotor 202. Additionally, motor 102 may be sensor-less, e.g. it may not include a discrete rotor position sensing mechanism such as one or more Hall sensors (e.g. the Hall sensors shown in FIG. 4). In another embodiment, motor 102 may include Hall sensors. Two of the three pairs of electromagnets 206 on stator 204 may be driven to induce or maintain rotation of rotor 202 at any given time. Motor 102 may then utilize one of the undriven electromagnets of stator 204 to indirectly detect the position of rotor 202 (or it may use Hall sensors for detection). The phases of stator 204 may be driven in a pattern ideally configured to induce rotation of rotor 202. The polarity of electromagnets 206 may be periodically commutated as part of this pattern.

Figure 3:
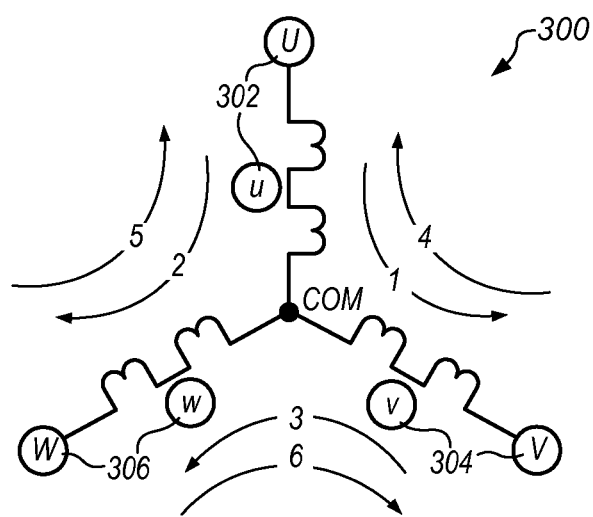
FIG. 3 illustrates the commutation pattern of a brushless three-phase electric motor according to one embodiment.

FIG. 3—Commutation Pattern of a Brushless Three-Phase Motor

FIG. 3 illustrates a simplified circuit diagram depicting a commutation pattern of a brushless three-phase motor according to one embodiment. Motor 102 may be a brushless, three-phase DC motor as described above. Electromagnets 206 may be connected in a "Y" configuration as shown. Motor 102 may also be a sensor-less motor as also described above, e.g. it may utilize an undriven stator electromagnet to indirectly detect the position of the rotor. In alternate embodiments, motor 102 may include Hall sensors to detect the position of rotor 202. Motor 102 may determine the timing of each commutation of the commutation pattern according to one embodiment of a method described herein. To control rotation of rotor 202, two pairs of the electromagnets on stator 204 may be driven at any one time. A given pair may be driven on the 'high-side' or the 'low-side', indicating in which direction current is being conducted in the windings of the driven pair of electromagnets. Depending on the number of poles in rotor 202, the electromagnets of a given pair of electromagnets may be wound in the same direction or in opposite directions. For example, with a four-pole rotor (as shown in FIG. 2), the windings may be configured such that the opposite sides of an electromagnet pair may present the same polarity (e.g., 'S') to the rotor, while with a two pole rotor, the windings may be configured such that the opposite sides may present opposing polarity (e.g., one 'S', one 'N'). Thus in some cases the convention used to define the polarities indicated by 'high-side' and 'low-side' may depend on the magnetic configuration of rotor 202. Other naming and/or driving conventions are also possible and are contemplated.

A commutation cycle may include six phases. The phases may correspond to the numbered arrows ('1' through '6') shown in FIG. 3. In FIG. 3, each arrow points from the high-side driven pair to the low-side driven pair. Thus for example, arrow '1' may indicate that in the first phase of the commutation cycle, 'U' electromagnet pair 302 may be driven on the high-side, while 'V' electromagnet pair 304 may be driven on the low-side, with 'W' electromagnet pair 306 remaining undriven. Arrow '2' may then indicate that in the second phase of the commutation cycle, 'U' electromagnet pair 306 may again be driven on the high-side, while 'W' electromagnet pair 304 may be driven on the low-side, with 'V' electromagnet pair 302 remaining undriven. Each of the remaining numbered phases (illustrated by arrows '3' through '6') would operate in a similar manner to create a full commutation cycle, which may be repeated to increase, maintain, or otherwise affect rotation of rotor 202.

If motor 102 is a DC powered motor, rotational speed may be controlled by means of pulse width modulation (PWM) of the electromagnets. Generally speaking, a PWM duty cycle may indicate how fast rotor 202 should rotate. More specifically, the PWM duty cycle may specify how often and with how much power to drive electromagnets 206 of stator 202.

As noted above, one pair of electromagnets may remain undriven during each phase of the commutation cycle. If rotor 202 is rotating, the movement of the one or more permanent magnets in rotor 202 past the undriven electromagnet may cause an induced voltage in the undriven electromagnet. Thus, during each phase of the commutation cycle, whichever pair of electromagnets is undriven may be used to sample the voltage induced by the rotation of the permanent magnet(s) in rotor 202 in one or both of those electromagnets. This is also known as Back Electro-Motive Force (BEMF) sampling. The sampled voltage may be used to help determine the present position and/or rotational velocity of rotor 202. The sampled voltage or information inferred from the sampled voltage may be used to control future commutation timing and/or other aspects of motor control according to various embodiments. As noted above, embodiments in which motor 102 includes Hall elements (i.e. Hall effect sensors) to detect the absolute position of the rotor, BEMF sampling may not be required, and therefore may not be used.

Figure 4:
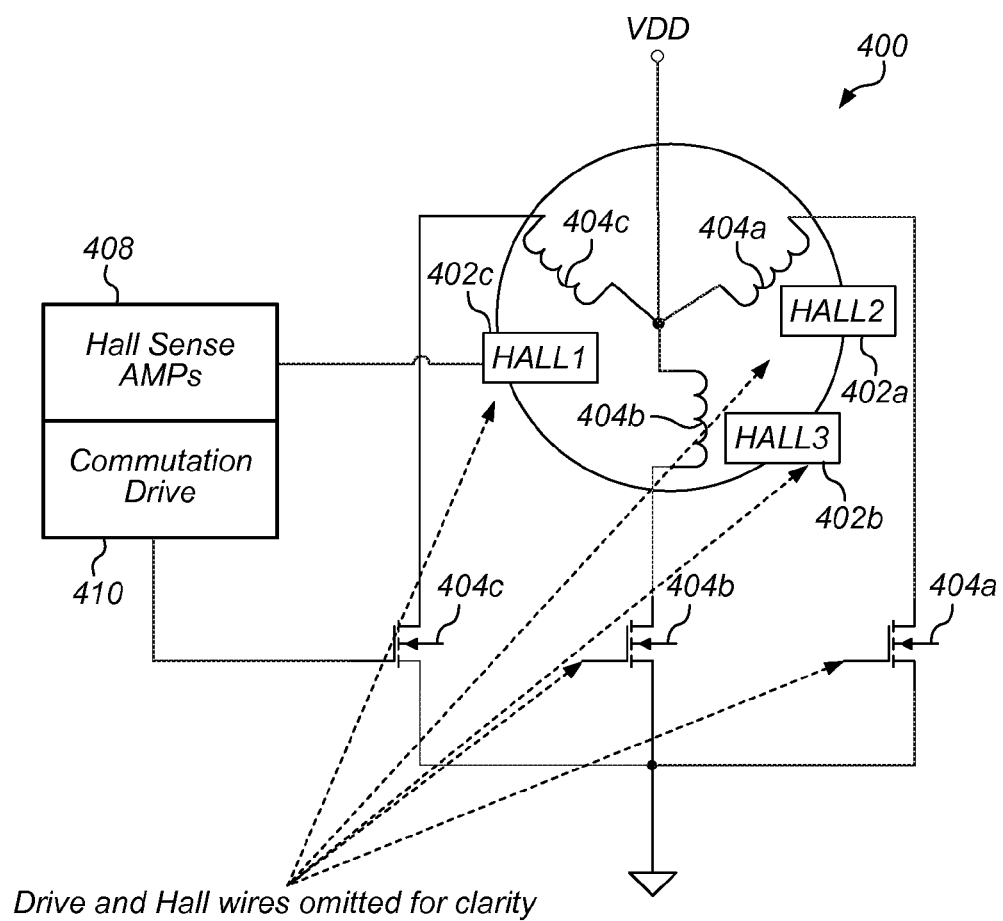
FIG. 4 is a circuit diagram of one embodiment of a motor with Hall Sensors and Hall Sense amplifiers.

FIG. 4—Circuit Diagram of a Motor with Hall Sensors and Hall Sense amplifiers

As mentioned above, some motors may include Hall elements (or sensors) to detect the position of rotor 202. FIG. 4 illustrates a simplified circuit diagram depicting brushless DC motor 400 that includes Hall effect sensors 402a-402c. One advantage of brushless motors in general is the reduction in the power required to operate the motor. FIG. 4 is illustrative of one embodiment of a typical three-phase brushless DC (TPDC) motor. The drive electronics for motor 400 rely on Hall elements (Hall effect sensors) 402a-402c to detect the absolute position of the rotor at all times, and switch drive transistors (404a-404c) to maintain motor rotation. A Hall effect sensor may be a transducer that varies its output voltage in response to changes in magnetic field. Motor 400 may be electrically connected in a "Y" configuration as shown (and as also previously mentioned), so named due to the configuration's resemblance to the letter "Y". A common point for the three coils 404a-404c may be connected to the electrical source VDD, and drive electronics 410 may be operated to switch drive transistors 404a-404c to maintain the rotating electro-magnetic field required to turn motor 400.

Figure 5:
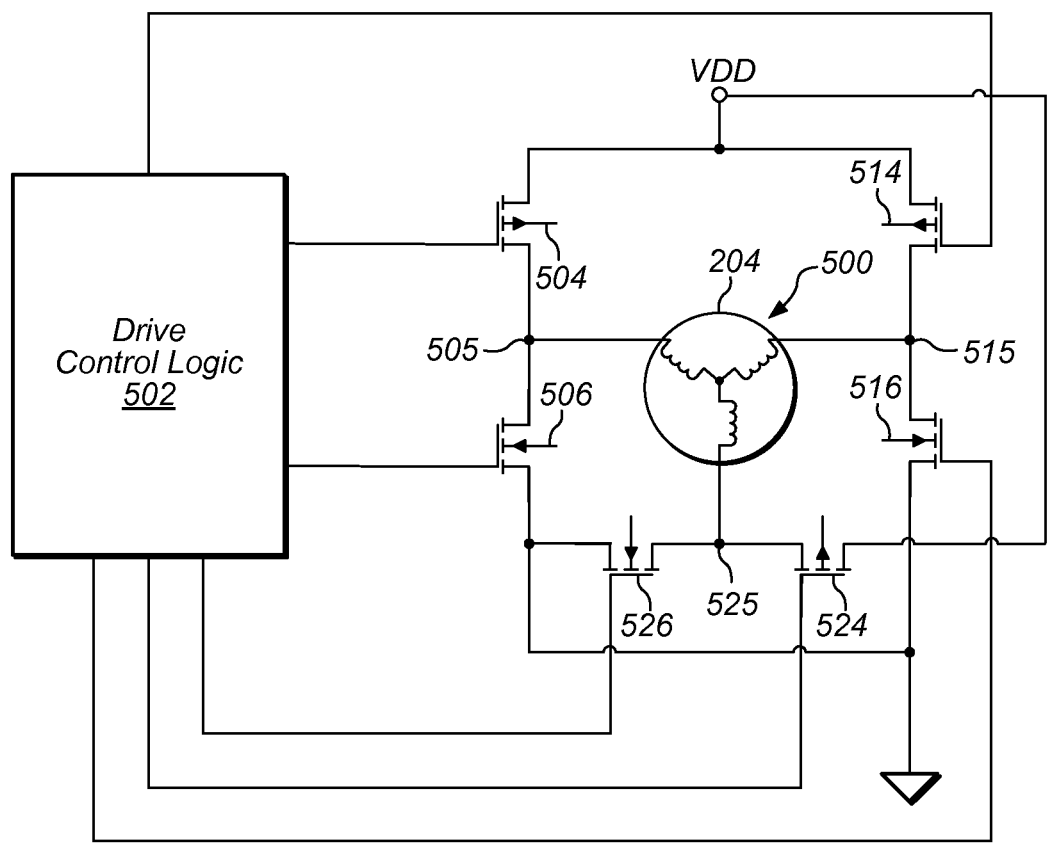
FIG. 5 is a circuit diagram of one embodiment of a motor with drive control logic.

FIG. 5—Circuit Diagram of a Motor with Drive Control Logic

FIG. 5 illustrates a simplified circuit diagram of a motor 500 (which may be similar to motor 102 shown in FIG. 2), and its drive control logic 502. In contrast to motor 400 shown in FIG. 4, motor 500 may use six drive transistors, as shown in FIG. 5. In this configuration, one high-side pair of electromagnets and one low-side pair of electromagnets may be on at any point in time, completing the electrical circuit through two of the three legs (of the Y configuration) of the motor. As previously mentioned, in this case the un-energized coil may be used as a magnetic sensor to determine the rotor position, referred to as BEMF detection. The motor system shown in FIG. 5 therefore has the added benefit of eliminating the relatively expensive Hall elements and associated electronics (shown in FIG. 4).

Overall, motor 500 may be a sensor-less, brushless, three-phase motor as described above and illustrated in the various Figures. As shown, motor 500 may include a stator 204, which may include three pairs of electromagnets. Each pair of electromagnets may have a corresponding pair of transistors, e.g., field effect transistors (FETs). The transistors may be configured such that each pair of electromagnets is effectively bipolar, e.g., the polarity may be reversible. In other words, for each electromagnet pair, one transistor may drive the pair on the high-side, or the other transistor may drive the pair on the low-side. For example, FET 504 may be the high-side transistor for the 'U' pair 302, while FET 506 may be the low-side transistor for the 'U' pair of electromagnets 302. Similarly, FETs 514 and 516 may be the respective high-side and low-side transistors for the 'V' pair of electromagnets 304, while FETs 524 and 526 may be the respective high-side and low-side transistors for the 'W' pair of electromagnets 306. In addition to the particular embodiment shown, any number of other wiring configurations (e.g. using a different number or types of transistors) is also be possible and is contemplated.

The transistors for each pair of electromagnets may be controlled by drive control logic 502. Drive control logic 502 may be electronic logic configured to perform various operations as described herein, such as sampling voltages induced across the electromagnets, performing calculations (e.g. simple integer math or more complex operations) to determine values used for controlling the electromagnets, and/or sending control and/or power signals to the electromagnets. Drive control logic 502 may also receive signals from one or more outside control devices, such as a fan speed control device. For example, a fan speed control device might periodically send an input command indicating a desired change in motor velocity based on some outside condition, such as an ambient temperature, which drive control logic 502 might incorporate into its control calculations. Other outside control devices are also envisioned. Alternatively, such control devices may be incorporated into drive control logic 502 itself.

In addition to any steady state or natural commutation control logic functions described herein, drive control logic 502 may have logic for controlling the motor under other conditions; for example, drive control logic 502 may include logic for a DC excitation operation to align the rotor to a known position prior to beginning rotation; logic for a forced commutation operation to begin rotation of the rotor; logic for stopping rotation of the rotor; logic for determining if a stall condition exists; and/or logic for other functions, as well as logic for switching from one function to another at an appropriate time.

Drive control logic 502 may be any of various types of logic, e.g., analog or digital, or a combination thereof. For example, drive control logic 502 may be implemented as a processor, e.g. a microcontroller, executing instructions comprised on a memory medium; a state-machine based digital controller; a Field Programmable Gate Array (FPGA) and/or a mixed signal application specific integrated circuit (ASIC). Alternatively, drive control logic 502 may include any combination of the above. Drive control logic 502 may thus be implemented using any of various digital or analog techniques, or a combination thereof, as would be apparent to one of ordinary skill in the art.

As previously mentioned, motor 500 may be a brushless, three-phase motor as described above and illustrated in the various Figures. Motor 500 may thus be structured and may operate as motor 102 described in FIG. 2. A steady state operation of motor 500 may be referred to as the natural commutation operation of the motor. Steady state or natural commutation may refer to operation of a motor once the rotor is already spinning. In other words, natural commutation may refer to maintaining or adjusting the rotation speed of the rotor once it is already in motion. In some embodiments a motor may use a different method (e.g. different control logic) for initiating rotation of a stationary rotor than it may use for maintaining or adjusting the rotation speed of an already rotating rotor.

Three-phase brushless motors, such as motor 500, may be driven with either sinusoidal or trapezoidal current waveforms. Classic drive schemes may rely on creating zero current switching in order to minimize the effects of changes in instantaneous torque. These periodic changes in torque occur when the coils are energized and de-energized, or commutated, producing mechanical vibrations and altering the inherent acoustic signature of the fan impeller. Both effects may be undesirable in many applications, including fans for the PC industry.

The effects of commutation on motor 500 may be minimized using a sinusoidal current drive on each coil. This may be accomplished in one of two ways, using a drive transistor as a linear pass device to create a sinusoidal current drive or to use a changing PWM duty cycle to create an effective sinusoidal current around each commutation point. However, each of these methods has some limitations. If a transistor is being used as a pass element to generate a sinusoidal current in the coil, any voltage in excess of the voltage needed for sinusoidal waveform generation may constitute energy that is lost through dissipation.

Use of a changing PWM duty cycle to create an effective sinusoidal current around each commutation point may not suffer from the losses of a linear pass element, but it may consume additional current, as there will be a minimum time when the current through any coil is zero. This may increase current consumption at any point where all three coils are driven. In one set of embodiments, in order to minimize the effects of the coils switching, the "on" times and/or "off" times of drive transistors in a full "H-bridge" drive scheme, such as the one shown in FIG. 5, may be delayed. That is, the respective "on" times and/or "off" times of transistor pairs 504 and 506, 514 and 516, and 524 and 526 may be delayed such that the respective drive signals provided to the electromagnets (and coils) between which the commutation occurs overlap. By overlapping the "on" times with respect to the commutation command or the "off" times with respect to the commutation command, it may be possible to minimize the effects of coils turning off. In addition to overlapping the off-timing (or on-timing), the waveform of the current conducted in the coils of the electromagnets may be shaped to minimize the instantaneous rotational torque generated as the coil turns off. The overlap times may be controlled by digital timers, making the response predictable and easily controlled.

Figure 6:
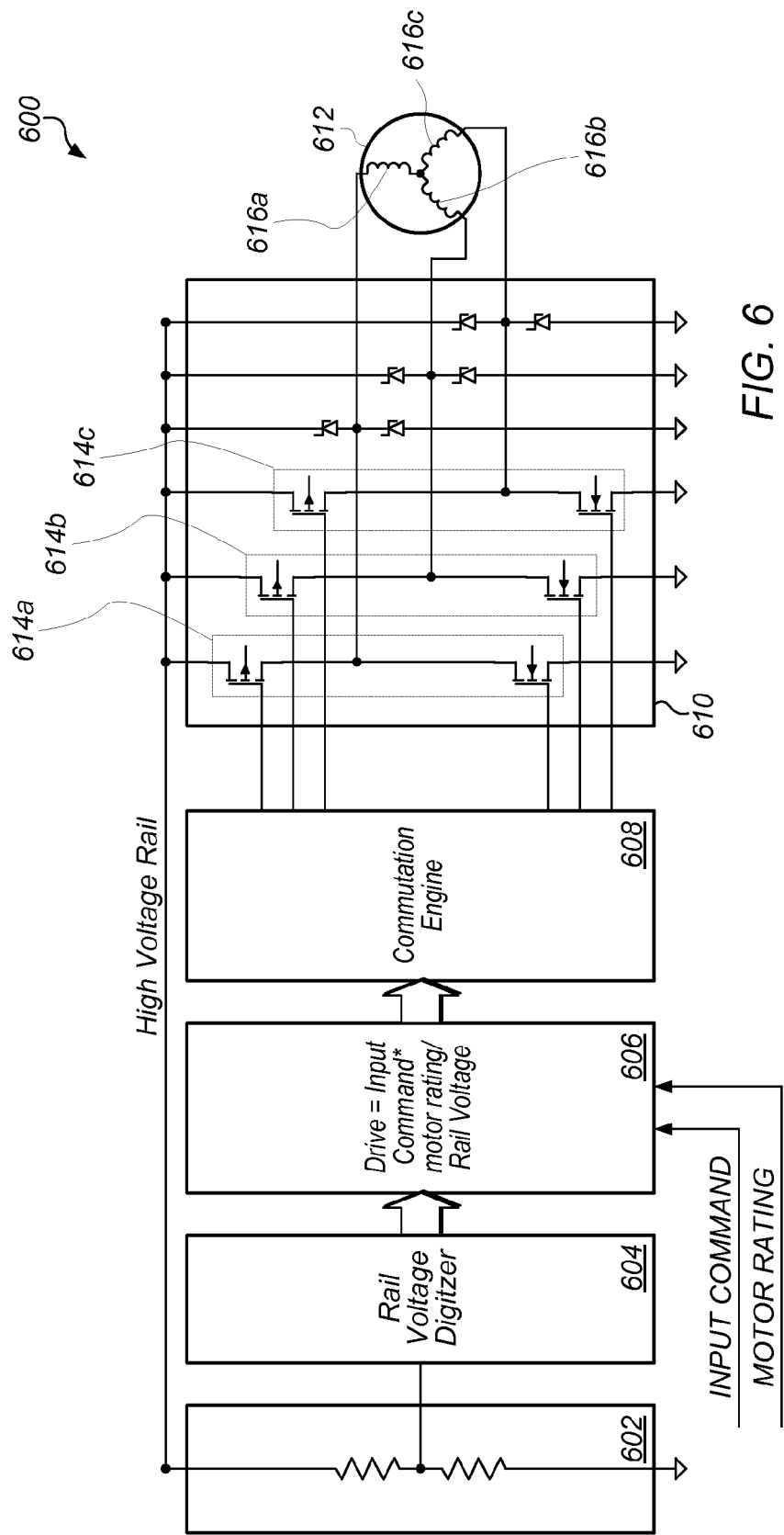
FIG. 6 is shows a simplified block diagram of another embodiment of a rotating motor and control circuitry to control a speed of rotation of the motor.

FIG. 6—Circuit Diagram of another embodiment of a Motor with Drive Control Logic FIG. 6 illustrates a simplified circuit diagram of another embodiment of a motor system 600. Motor system 600 may include motor 612 (which may also be similar to motor 102 shown in FIG. 2), and drive control logic that includes a voltage divider circuit 602, a digitizer circuit 604, a calculation block 606, and a commutation engine 608. Motor 612 is driven by driver block 610, which may include multiple driver stages, each of which may be considered the corresponding driver stage of a respective buck regulator, with each driver stage including a respective pair of transistors controlling an output voltage provided to a corresponding coil of motor 612, and by extension the power provided to the corresponding coil of motor 612. As shown in FIG. 6, drive transistor pair 614a is configured to drive coil 616a of motor 612, drive transistor pair 614b is configured to drive coil 616b of motor 612, and drive transistor pair 614c is configured to drive coil 616c of motor 612. In this embodiment, the respective stator coils 616a/b/c of motor 612 are used as the respective inductive elements that may be used by the respective voltage regulators (e.g. buck style regulators, as mentioned above) for regulating the induced current provided to a load, to regulate the output voltage. In this case, while transistor pairs 614a/b/c may be used as the respective driving stages of corresponding voltage regulators, the primary functionality of the regulators is to regulate the respective currents induced in coils 616a/b/c, while the actual output voltage delivered to each coil may vary in time. To control the amount of current conducted by each coil, the desired value of the control signal provided to the various transistor pairs 614a/b/c may be determined by calculation block 606 based on the input command and motor rating (as previously described), and on the value of the voltage rail obtained in real time through voltage divider 602 and rail voltage digitizer 604. The calculated value of the control signal (or respective control signals) is then provided to commutation engine 608, which may generate the corresponding control signals for drive transistors 614a/b/c based on the calculated value obtained from calculation block 606.

Using the stator coils of motor 612 as the inductive elements for respective voltage regulator(s), and calculating the drive signal, or respective drive signals for stator coils 616a/b/c according to (or based on) the value of the rail voltage allows for a wide variation of input voltage (variation of high rail voltage) to motor 612, while maintaining a relatively constant output power to the motor 612. In the embodiments shown, the drive signal is a pulse width modulated (PWM) signal provided to transistor pairs 614a/b/c, which may be operated as the output driver stages of respective switching voltage regulator(s), e.g. a buck regulator(s). In this case, the value of the control signal, or each respective control signal, is the PWM duty cycle, or a respective PWM duty cycle, which corresponds to the PWM control signal, or respective PWM control signals generated by commutation engine 608. It should be noted, however, that different embodiments may use different types of driver stages and/or corresponding voltage regulators, and in such embodiments the control signal, or respective control signals may be of a different type than a PWM signal. The manner in which the value of the control signal, or respective control signals is determined, as described herein, is independent of the type of control signal used, and may be used, more generally, to determine the desired value of the control signal(s) to be provided to a respective drive stage or drive stages for powering the stator coils in the motor, in order to appropriately scale the maximum current through the stator coils to the same magnitude that the coils would be expected to conduct if the rail voltage were the rated fan/motor voltage, not the different, e.g. higher voltage rail to which the motor is actually coupled. In other words, various embodiments of powering a rotating motor, e.g. motor 612 in FIG. 6, may include scaling the value of a control signal used for controlling power to the motor based on the value of the rail voltage, in addition to other factors, e.g. in addition to motor rating, and an input command indicative of a specified value of the control signal (which may simply be a previously determined value of the control signal).

It should also be noted, that as determined by the operation of transistor driver stages 614a/b/c connected as shown in FIG. 6, each respective output voltage provided to coils 616a/b/c may have a specific value determined by the high voltage rail, the transistor devices, and the voltage reference to which the bottom transistors are coupled. Accordingly, adjusting the respective output voltages provided to coils 616a/b/c in this case might refer to adjusting the time period during which the transistors are turned on and turned off, to control how long the specific voltage (close to high voltage rail when the transistors are turned on, and close to the voltage reference when the transistors are turned off) is provided to each coil. In alternate embodiments, depending on the method of power delivery to coils 616a/b/c, the output voltage may actually vary along an analog scale, and adjusting the output voltage in that case may result in various different voltage values provided to each coil.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method for controlling a rotating motor, wherein the motor comprises a plurality of electromagnets, wherein each electromagnet comprises a respective coil, the method comprising:
    measuring the value of a supply voltage;
    receiving an input command to adjust a speed of rotation of the rotating motor;
    determining and scaling the value of a duty cycle of a pulse width modulated control signal based on the input command and on the measured value of the supply voltage; and generating an output voltage adjusted to a motor rating in one or more of the coils using the control signal to obtain a desired value of the respective current, wherein the control signal controls two switching transistors whose switching paths are coupled in series between the supply voltage and ground wherein a node between the switching paths is connected to a coil of the motor and wherein the switching transistor pair and the coil are operated as a buck voltage regulator.

2. The method of claim 1, wherein said issuing an input command comprises:
   generating one or more time values based on a representation of the angular velocity of the rotating motor; and
   generating the input command based on the one or more time values.

3. The method of claim 1, wherein the duty cycle is further scaled based on a motor rating.

4. A system comprising:
   an electronic rotating motor, wherein the electronic rotating motor comprises a stator comprising a plurality of electromagnets, wherein each electromagnet comprises a respective coil;
   a driver circuit powered by a supply voltage, and configured to provide an output voltage derived from the supply voltage to each of the plurality of electromagnets, to induce a respective current in the respective coil of one or more of the plurality of electromagnets to generate respective induced currents; and
   a control block configured to adjust the value of each of the generated respective induced currents by pulse width modulation, wherein a duty cycle is adjusted based on an input command and the value of the supply voltage to adjust an angular velocity of the electronic rotating motor,
   wherein the control block is further configured to obtain one or more time values based on a representation of the angular velocity of the electronic rotating motor determined by the induced respective currents, and generate the input command based on the one or more time values.

5. The system of claim 4, wherein the control block is further configured to generate one or more control signals based on the input command and the value of the supply voltage, and adjust the value of each of the generated respective induced currents by controlling the one or more of the plurality of electromagnets with the one or more control signals.

6. The system of claim 4, wherein the driver circuit comprises for each motor coil two switching transistors whose switching paths are coupled in series between the supply voltage and ground wherein a node between the switching paths is connected to a respective coil of the motor and wherein each switching transistor pair and associated coil are operated as a buck voltage regulator.

7. The system of claim 6, wherein the supply voltage is higher than a rated voltage for said motor.

8. A system for controlling an electronic motor that comprises a plurality of electromagnets, wherein each electromagnet comprises a respective coil, the system comprising:
   a driver circuit powered by a supply voltage, and configured to provide an output voltage derived from the supply voltage to each of the plurality of electromagnets, to induce a respective current in the respective coil of one or more of the plurality of electromagnets to generate respective induced currents; and
   a control block configured to adjust the value of each of the generated respective induced currents by pulse width modulation, wherein a duty cycle is adjusted based on an input command and the value of the supply voltage to adjust an angular velocity of the electronic motor,
   wherein the control block is further configured to determine one or more time values based on a representation of the angular velocity of the electronic motor determined by the induced respective currents, and generate the input command based on the one or more time values.

9. The system of claim 8, wherein the control block is further configured to generate one or more control signals based on the input command and the value of the supply voltage, and adjust the value of each of the generated respective induced currents by controlling the one or more of the plurality of electromagnets with the one or more control signals.

10. The system of claim 8, wherein the driver circuit comprises for each motor coil two switching transistors whose switching paths are coupled in series between the supply voltage and ground wherein a node between the switching paths is connected to a respective coil of the motor and wherein each switching transistor pair and associated coil are operated as a buck voltage regulator.

11. The system of claim 10, wherein the supply voltage is higher than a rated voltage for said motor.

12. A method for controlling a rotating motor, wherein the rotating motor comprises a plurality of electromagnets, wherein each electromagnet of the plurality of electromagnets comprises a respective coil, the method comprising:
   inducing a respective current in one or more of the respective coils, by providing respective output voltages derived from at least one rail voltage to the one or more respective coils;
   receiving an input command to adjust the respective values of one or more pulse width modulated control signals used for adjusting a speed of rotation of the rotating motor;
   scaling duty cycles of the one or more pulse width modulated control signals based on the input command and a measured value of the at least one rail voltage to adjust each induced respective current to a desired respective value representative of a maximum current that the one or more respective coils are expected to conduct for a specified value of the rotating motor, wherein the specified value of the rotating motor is different from the measured value of the of the at least one rail voltage.

13. The method of claim 12, wherein the measured value of the at least one rail voltage is higher than the specified value of the rotating motor.

14. The method of claim 12, wherein said scaling the respective values of the one or more control signals comprises:
   sensing a value of the at least one rail voltage;
   digitizing the sensed value of the at least one rail voltage to obtain a numeric value representative of the present value of the at least one rail voltage;
   calculating respective desired values of the one or more pulse width modulated control signals according to the input command and the numeric value representative of the sensed value of the at least one rail voltage; and
   adjusting the respective values of the one or more pulse width modulated control signals to the corresponding respective desired values.

15. The method of claim 12, wherein said providing the respective output voltages comprises providing the respective output voltages through respective switching voltage regulators wherein each coil of the rotating motor is part of a respective switching voltage regulator.

16. The method of claim 15, wherein said scaling the respective values of the one or more control signals comprises scaling the respective duty cycles of respective pulse width modulated control signals provided to the respective switching voltage regulators.

17. A system comprising:
an electronic rotating motor, wherein the electronic rotating motor comprises a stator comprising a plurality of electromagnets, wherein each electromagnet comprises a respective coil;
a driver circuit powered by a supply voltage, and configured to provide an output voltage derived from the supply voltage to each of the plurality of electromagnets, to induce a respective current in the respective coil of one or more of the plurality of electromagnets to generate respective induced currents; and
a control block configured to adjust the value of each of the generated respective induced currents by pulse width modulation, wherein a duty cycle is adjusted based on an input command and the value of the supply voltage to adjust an angular velocity of the electronic rotating motor;
wherein the driver circuit comprises for each motor coil two switching transistors whose switching paths are coupled in series between the supply voltage and ground wherein a node between the switching paths is connected to a respective coil of the motor and wherein each switching transistor pair and associated coil are operated as a buck voltage regulator.

18. The system of claim 17, wherein the supply voltage is higher than a rated voltage for said motor.

* * * * *